United States Patent Office 3,263,525
Patented August 2, 1966

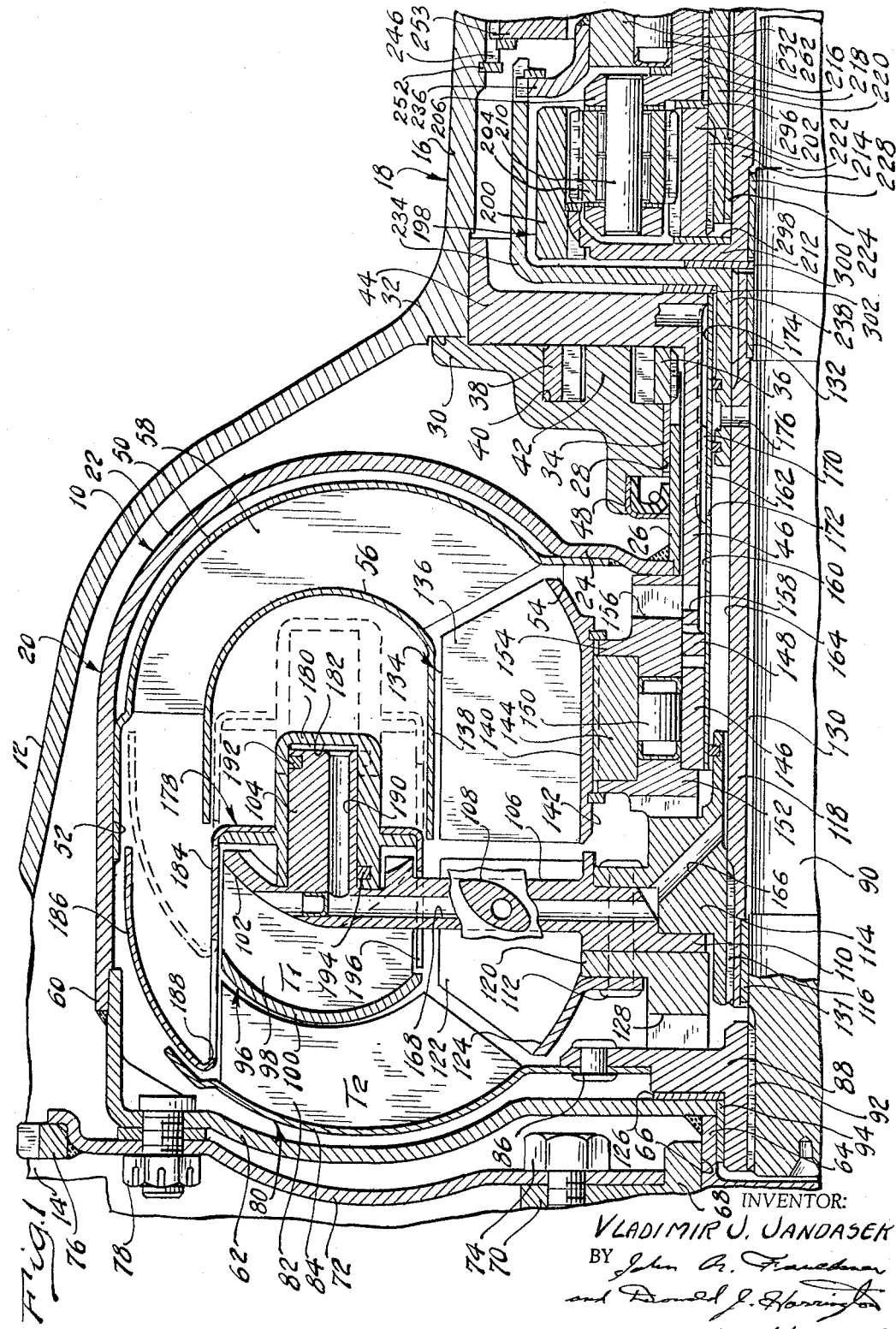

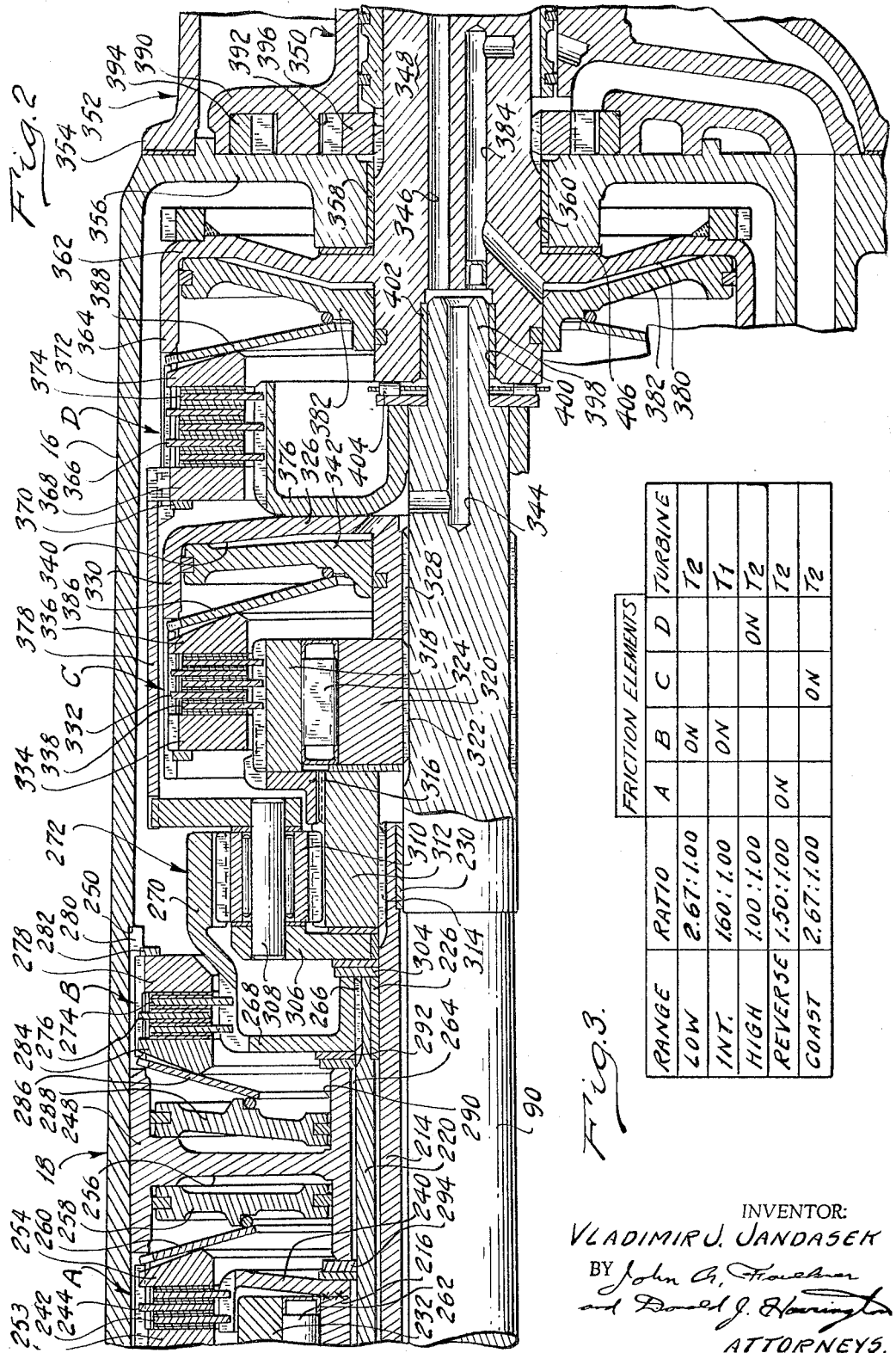

3,263,525
POWER TRANSMISSION MECHANISM WITH COMPOUND TORQUE CONVERTER
Vladimir Joseph Jandasek, Dearborn, Mich., assignor to Ford Motor Company, Dearborn, Mich., a corporation of Delaware
Filed Aug. 22, 1963, Ser. No. 303,879
6 Claims. (Cl. 74—677)

My invention relates generally to improvements in hydrokinetic power transmission mechanisms, and more particularly to a power transmission mechanism having a multiple turbine hydrokinetic unit and two simple planetary gear units acting in combination to form plural torque delivery paths between a driving member and a driven member, each path being characterized by a different speed ratio.

I contemplate that my improved mechanism can be employed in the driveline of an engine powered automotive vehicle for delivering engine power to the vehicle traction wheels. Each torque delivery path is defined in part by a separate turbine member of the hydrokinetic unit, and speed ratio changes can be accomplished by rendering the turbine members selectively operable. Each shift from one speed ratio to another occurs in a non-synchronous fashion to provide a continuous and smooth variation in the magnitude of the overall torque ratio between the driving member and the driven member.

The provision of a improved mechanism of the type above set forth being a principal object of my invention, it is a further object of my invention to provide a hydrokinetic torque converter unit having a double toroidal fluid flow circuit, each circuit comprising a common impeller and a separate turbine. I contemplate that each turbine will include shrouded blades that define a plurality of radial inflow bladed passages. The axial spacing of the turbines will permit the shroud of one turbine to function also as a shroud for the other turbine.

It is a further object of my invention to provide a mechanism of the type set forth in the preceding paragraphs wherein one turbine is connected to a power input element of one of the gear units and the other turbine is connected to a power input element of the other gear unit and wherein provision is made for alternately directing the torus flow in the hydrokinetic unit through each of the turbines to accomplish speed ratio changes.

According to another feature of a preferred embodiment of my invention, the reaction element of each gear unit is connected to a stationary housing portion of the mechanism through an overrunning coupling. Another overrunning coupling forms in part a driving connection between one of the turbines and the power input element of the first gear unit. This strategic arrangement of overrunning couplings in my improved mechanism makes possible nonsynchronous ratio shifts as the turbines are rendered selectively operable during the vehicle acceleration period. The provision of a coupling arrangement of this type is another object of my invention.

Further objects and features of my invention will become apparent from the following description and from the accompanying drawings wherein:

FIGURE 1 shows the hydrokinetic portion of my mechanism,
FIGURE 2 shows the gearing and the clutch and brake arrangement of my mechanism; and
FIGURE 3 is a chart showing the friction element engage and release pattern.
FIGURES 1 and 2, when viewed together, illustrate a longitudinal cross-section of my improved structure.

Referring first to FIGURE 1, a hydrokinetic torque converter unit is designated generally by reference character 10. It is disposed within a stationary bell housing portion 12 which may be bolted at its periphery 14 to the engine block of an internal combustion vehicle engine. Housing portion 12 is connected integrally with a main housing portion 16 to form an integral cast housing assembly. This assembly is designated generally by reference character 18.

The hydrokinetic torque converter unit 10 includes an impeller shell 20 having a first shell part 22 which is formed with a generally toroidal shape to conform with the shape of the impeller of the torque converter unit. The radially inward portion 24 of the shell part 22 is welded to an impeller support sleeve shaft 26. This shaft is journaled within an opening 28 formed in a separator wall 30. The periphery of the wall 30 is connected to a shoulder 32 formed in the interior of the housing portion 12.

A bushing 34 is provided for supporting the shaft 26 within the opening 28. The end of shaft 26 is keyed to a driving gear 36 for a positive displacement gear pump. An eccentrically positioned companion gear 38 meshes with the gear 36, both gears being disposed within a pump chamber 40 defined by the wall 30. A crescent 42 occupies the space between the gears 36 and 38.

A pump closure plate 44 is secured to the wall 30. It includes a stationary sleeve shaft extension 46 disposed within the shaft 26. A fluid seal 48 is provided between the wall 30 and the shaft 26.

An outer impeller shroud 50 is welded or otherwise secured at its periphery 52 to the inner surface of the shell part 22. It is secured also at its inner periphery 54 to the portion 24 of shell part 22. An inner impeller shroud is shown at 56. Impeller blades 58 are disposed between the shrouds 50 and 56 and cooperate with them to define radial outflow passages.

Shell part 22 is welded at its periphery 60 to the outer periphery of a second shell part 62. This shell part extends radially inwardly and the inner portion thereof is connected integrally to a hub portion 64 received with a pilot opening 66 formed in an engine driven crankshaft 68. The crankshaft is flanged at 70 to permit a driving connection with the inner periphery of a drive plate 72. This connection is established by bolts 74.

The outer periphery of the plate 72 carries an engine starter ring gear 76. It also is bolted by means of bolts 78 to the outer periphery of the shell part 62.

A turbine is identified generally by reference character 80. It includes turbine blades 82 which are joined to an outer turbine shroud 84. Blades 82 define radial inflow passages that communicate with the flow passages of the impeller.

The radially inward portion of shroud 84 is riveted by means of rivets 86 to a turbine hub 88. A turbine shaft 90 is splined at 92 to the hub 88. Hub 64 is journaled upon hub 88 by means of a bushing 94.

A second turbine is identified generally by reference character 96. It includes turbine blades 98 situated between an outer turbine shroud 100 and an inner turbine shroud 102. The blades 98 form in part radial inflow passages which communicate with the flow passages of the impeller.

The shroud 102 is connected integrally to an annular ring 104 situated within the inner torus region of the hydrokinetic unit. Shroud 102 and ring 104 are supported by a support member 106 in the form of a web that extends radially inwardly through the torus circuit. The web includes spokes that are formed with an aerodynamic cross-section as indicated at 108 to reduce to a minimum the resistance offered by the spokes to the torus flow.

The spokes of web 106 are connected to a hub 110 which in turn is riveted by means of rivets 112 to a hub 114. This hub 114 in turn is splined at 116 to a turbine sleeve shaft 118.

Hub 110 is connected also by means of rivets 112 to another hub 120 which supports flow directing blades 122 located at the flow exit region of the turbine blades 82. These blades 122 may be joined integrally with a shroud 124 which in turn is connected to the hub 120.

The hub 120 engages the hub 88, and the axial thrust between hub 88 and the shell part 62 is accommodated by a thrust washer 126. Radial slots 128 are formed in the hub 120 to provide communication between the torus circuit of hydrokinetic unit and the annular passage 130 formed by the concentric shafts 90 and 118. Shaft 118 is supported upon shaft 90 by means of bushings 131 and 132. The bushing 131 can be formed with axial grooves which form a continuation of the annular passage 130.

A stator is identified generally by reference character 134. It includes blades 136 situated at the flow entrance region of the impeller blades 58. The shroud 56 for the impeller is provided with an extension 138 which forms a shroud for the blades 136.

A stator shroud 140 supports blades 136 and is formed with a central opening 142. This opening is internally splined to permit a splined connection with an externally splined overrunning brake race 144. A cooperating overrunning brake inner race 146 is keyed at 148 to the end of the stationary sleeve shaft 46 and is held from rotation in this fashion. Overrunning brake elements in the form of sprags 150 are situated between the races 144 and 146.

A spacer element 152 is disposed between hub 114 and the races 146 and 144. Another spacer element 154 is disposed between the portion 24 of the shell part 22 and each of the races 144 and 146. Spacer element 154 can be provided with radial slots 156 which communicates with a port 158 in the sleeve shaft 46, the latter establishing communication with a passage 160 formed in the sleeve shaft 46. A sleeve 162 is received within the extension 46 to partly define passage 160. Sleeve 162 cooperates with turbine sleeve shaft 118 to define an annular feed passage 164 which communicates with a passage 166 formed in the hub 114 and with a passage 168 formed in the member 106.

Passage 164 communicates with a passage 170 formed in extension 46. This passage 170 is defined by an axial groove that is displaced angularly with respect to the passage 160, although it has been illustrated out of position in FIGURE 1. Ports 172 are provided to establish this communication between passage 164 and passage 170.

Passage 130 communicates with another passage 174 formed in the extension 46. A suitable port 176 is provided in shaft 118 for this purpose. The passage 174 is formed by means of an axial groove that is displaced angularly with respect to passages 170 and 160. The passages 160, 170 and 174 communicate with pressure feed passages formed in part in the plate 44 and define a portion of an automatic control valve circuit, not shown. The pump, shown in part at 36 and 38, forms a part of this circuit.

Supported upon the annular ring 104 is a fluid flow diverter or baffle 178. It includes an annular portion 180 that is received telescopically over the ring 104 to define a servo pressure chamber 182. Diverter 178 includes also an annular baffle ring 184 which is connected to an annular shroud 186. This shroud defines a portion of the torus circuit structure.

Openings 188 are formed in the annular portion 184 of the diverter 178. These openings 188 communicate with the flow passages of the turbine 80 when the diverter assumes the position shown in FIGURE 1.

The diverter 178 is capable of shifting axially upon the annular ring 104. This is done by pressurizing the chamber 182 by introducing pressure through passage 168. This passage in turn communicates with a branch passage 190 extending axially through ring 104. A sealing ring 192 is carried by the ring 104 and another sealing ring 194 is carried by the portion 180.

The diverter includes also a portion 196 which blocks the flow passages for the turbine 96 when it assumes a left hand position. Portion 196 is slotted to permit the support member 106 to extend therethrough without interference.

Portions 196 and 184 are secured to the portion 180 by welding or by any other suitable fastening method to form an integral assembly.

As the diverter is shifted in a right hand direction, the flow that leaves the exit region of the impeller is directed into the entrance region of the turbine 96, and the fluid flow into the entrance region of the turbine 80 is interrupted. Turbine 80 then is rendered inoperable, but turbine 96 is capable of developing turbine torque. If the diverter assumes a left hand position, however, turbine 80 is rendered operable and turbine 96 is rendered inoperable. The flow from each of the turbines is directed by the blades 122 to the inlet region of the stator blades 136.

During operation of the hydrokinetic torquet converter unit, a continuous flow of fluid is circulated through the torus circuit. The passage 134 functions as a converter flow return passage and the passage 160 functions as a converter fluid supply passage.

A planetary gear unit is indicated generally by reference character 198. It includes a ring gear 200, a sun gear 202, planet gears 204 and a carrier 206. Gears 204 are rotatably supported upon pinion shafts 210 that are carried by the carrier 206.

Ring gear 200 is keyed or splined to the outer periphery of a radially extending drive member 212 which is connected to a sleeve shaft 214 surrounding the shaft 90. Carrier 206 is connected to an overrunning coupling inner race 216 which is journaled by means of a bushing 218 upon a sun gear sleeve shaft 220, the latter being splined at 222 to the sun gear 202. Shaft 220 in turn is supported upon shaft 214 by bushings 224 and 226. Shaft 214 in turn is supported upon shaft 90 by bushings 228 and 230.

An overrunning coupling outer race is shown at 232. It is positively connected to a torque transfer member 234 by means of a connecting element 236. Member 234, in turn, is splined at its hub 238 to sleeve shaft 118.

Inner coupling race 216 is connected directly to a brake element 240 which has splined to its outer periphery internally splined brake discs 242. These discs are situated on either side of a brake disc 244 which is externally splined to a splined portion 246 of a brake drum 248. Drum 248 is secured to the interior of the housing portion 16. It is held axially fast therein by means of a shoulder 250 and a snap ring 252.

A clutch reaction disc 253 is splined to the portion 246 and held axially fast thereon by means of snap rings as indicated.

A clutch pressure plate 254 also is keyed or splined to the drum 248 and is axially shiftable relative thereto to engage the discs 242 and 244 and anchor the race 216.

Drum 248 defines an annular cylinder 256 upon which is positioned an annular piston 258. Piston 258 and cylinder 256 cooperate to define a fluid pressure chamber that may be pressurized selectively by distributing fluid thereto through suitable internal passage structure, not shown.

Piston 258 engages the inner periphery of a Belleville type piston return spring 260 which is pivoted at its outer periphery to the drum 248. The intermediate portion of spring 260 engages plate 254 so that the piston force is multiplied by the amount of the leverage ratio of the spring 260.

Overrunning coupling elements 262 are situated between races 216 and 232. These establish a one-way coupling connection between the races with relative freewheeling motion thereof in a backward direction being permitted. Shaft 220 extends through an opening 264 formed in the drum 248 and is splined at 266 to a brake member 268. This member in turn is connected directly to the ring gear 270 of a second planetary gear unit 272.

Member 268 is positively connected to internally splined brake discs 274 situated on either side of a brake disc 276 carried by the drum 248. A brake disc reaction ring 278 is keyed or splined to the drum 248, the latter being appropriately provided with a splined portion 280. A snap ring 282 holds the ring 278 axially fast.

A brake disc pressure plate shown at 284 is connected to the portion 280 and adapted to slide axially relative to drum 248 to engage frictionally the discs 274 and 276. Plate 282 is engaged by a Belleville type piston return spring 286 which is pivoted at its outer periphery to the drum 248. The inner periphery of disc 286 is engaged by piston 288 which is slidably positioned within an annular cylinder 290 formed in the drum 248. Cylinder 290 and piston 288 cooperate to define a brake servo pressure chamber which may be pressurized selectively by means of suitable internal passage structure, not shown.

Thrust washers are provided to accommodate the axial thrust produced by the servo loads and the gear loads. These are shown at 292, 294, 296, 298, 300 and 302. Another thrust washer 304 is disposed between member 268 and a carrier 306 for the second planetary gear unit 272. Pinion shafts 308 are carried by the carrier 306 to rotatably support planet pinions 310. These pinions mesh with ring gear 270 and with sun gear 312, the latter being splined at 314 to the shaft 214.

Sun gear 312 is connected also by means of a connecting member 316 to an outer race 318 for a second overrunning coupling. This coupling includes also an inner race 320 which is splined at 322 to the shaft 90. Overrunning coupling elements in the form of sprags 324 are situated between the races 318 and 320 to permit a one-way driving connection between the races and accommodate overrunning relative motion in a backward direction.

A clutch drum 326 is splined at 328 to the shaft 90. The outer peripheral portion 330 for the drum 326 carries clutch discs 332, a clutch pressure reaction ring 334 and a clutch pressure plate 336. The plate 336, the ring 334 and the discs 332 can be externally splined to permit a driving connection with a slotted or splined portion of the outer periphery of the drum 326.

Internally splined clutch discs 338 are carried by race 318 which may be externally splined, as indicated.

Drum 326 defines an annular cylinder 340 within which is received an annular piston 342. This piston and cylinder cooperate to define a fluid pressure chamber that is in fluid communication with pressure feed passage 344 formed in the shaft 90. Passage 344 in turn communicates with a passage 346 formed in the power output shaft 348. This passage in turn communicates with a fluid pressure distributor manifold indicated generally by reference character 350. It includes a sleeve that surrounds shaft 348 and which is disposed within a tailshaft extension housing 352. This housing in turn can be bolted at its margin 354 to an end wall 356 of the housing portion 16.

Power output shaft 348 is rotatably journaled by means of a bushing 358 within an opening 360 formed in the wall 356. Clutch drum 362 is carried by the shaft 348 and includes a slotted or splined outer peripheral portion 364. Externally splined clutch discs 366 are carried drivably by the portion 364. A clutch pressure reaction ring 368 also is carried by the drum 362 and held axially fast by a snap ring 370. A clutch pressure plate 372 also is carried by the drum 362.

Internally splined clutch discs 374 are drivably carried by a clutch member 376 which is welded or otherwise positively connected to drum 326. Drum 362 is drivably coupled to carrier 306 by means of a torque transfer drum 378.

Drum 362 forms an annular cylinder 380 within which is positioned an annular piston 382. This piston and cylinder cooperate to define a clutch servo pressure chamber that is in fluid communication with a pressure feed passage 384 formed in the power output shaft 348.

Like the passage 346, the passage 384 also communicates with the fluid pressure distributor manifold 350. This manifold forms a part of the automatic control valve system, not shown.

Piston 342 is adapted to apply a clutch actuating force to the pressure plate 336 by means of a Belleville type piston return spring 386 which is pivoted at its outer periphery to the drum 326. Piston 342 engages the inner periphery of spring 386 when cylinder 340 is pressurized thereby causing the discs 332 and 338 to become engaged frictionally. In a similar fashion, the piston force of piston 382 is transferred to pressure plate 372 by means of a Belleville type piston return spring 388 which is pivoted at its outer periphery to the drum 362. The inner margin of the spring 388 engages the piston 382 as indicated so that the pressure force applied to the piston 382 is magnified as the clutch discs 366 and 374 become engaged frictionally.

The manifold 350 includes a pump housing 390 which defines a pump chamber 392. Positive displacement pump gear elements 394 and 396 are disposed within the chamber 392. Element 396 is keyed drivably to shaft 346 so that it develops pressure whenever the shaft 348 rotates.

Shaft 90 is formed with a reduced diameter portion 398 which is journaled within a pilot opening 400 formed at the end of the shaft 348, a suitable bushing 402 being provided for this purpose.

A thrust washer assembly 404 is disposed between the adjacent ends of shaft 90 and 348. A thrust washer 406 is provided also between the end wall 356 and the drum 362.

The structure shown in FIGURES 1 and 2 is capable of providing three forward driving speed ratios and a single reverse speed ratio. For purposes of describing the mode of operation, the front and rear brakes are identified in FIGURE 3 as elements "A" and "B," respectively. Also the front and rear clutches are identified in FIGURE 3 by the symbols "C" and "D," respectively. Furthermore, the turbines are identified separately by the symbols "T2" and "T1."

During operation in the first or low speed ratio and also during second or intermediate speed ratio, brake B is engaged. All the other friction devices are released. During initial operation from a standing start, the diverter 178 is shifted in a left hand direction. This can be done by exhausting pressure from passage 168. The diverter then is actuated in response to the force developed by the pressure developed in the hydrokinetic unit. The flow passages of the impeller then are in communication with the flow passages of the turbine 80. Turbine 96, however, is rendered inoperable since the diverter 178 blocks communication between its flow passages and the passages of the impeller.

The turbine torque developed by the turbine T2 is distributed through shaft 90 to the inner race 320 of the rear overrunning coupling. Coupling elements 324 establish a one-way driving connection between race 318 and sun gear 312 so that sun gear 312 is caused to rotate with the turbine T2. Ring gear 270 is anchored to the housing by the brake B and therefore is capable of functioning as a reaction member. Carrier 306 is then driven at a reduced speed ratio and its motion is transmitted to the power output shaft through drum 378 and clutch drum 362.

To establish a shift to the intermediate speed ratio, it merely is necessary to pressurize the pressure chamber 182 of the diverter servo. This causes the diverter 178 to assume a right hand position to establish communication between the flow passages of the impeller and the passages of the turbine 96. Fluid flow to the passage of the turbine 80 is interrupted and turbine torque is then developed by the turbine T1. It is distributed through turbine shaft 118 to the carrier 206 of the planetary gear unit 198. Sun gear 202 is anchored since it is connected directly to shaft 220 which is anchored by the brake B.

Ring gear 200 which then is overdriven, drives sun gear 312. The overrunning coupling begins to freewheel at this point and ring gear 270 continues to act as a reaction member. The carrier 306 then will be driven at an increased speed. This motion, of course, is transmitted as before to the power output shaft 348.

To establish high speed ratio or direct drive cruising operation, the diverter 178 is shifted again in a left hand direction to render the turbine T2 operable. Brake B is released and clutch D is applied. The turbine torque delivered to shaft 90 is then transferred directly through clutch D to the drum 362. Thus the shaft 348 becomes connected directly to turbine T2.

To establish reverse drive operation, it merely is necessary to engage brake A while the diverter 178 assumes a left hand position. This causes the carrier 206 to become anchored to the housing. Turbine torque delivered to the shaft 90 then is transferred to the rear overrunning coupling to the sleeve shaft 214. This causes ring gear 200 to rotate in a forward driving direction. Since carrier 206 acts as a reaction member, sun gear 202 and sun gear shaft 220 are driven in a reverse direction. This reverse motion, of course, is imparted to the ring gear 270. The combined effect of the backward motion of the ring gear 270 and the forward motion of sun gear 312 results in a backward motion of the carrier 306. This backward motion, of course, is transmitted directly to the power output shaft 348.

To establish a coast-braking condition, brake B is applied to hold sun gear 202 stationary. Clutch C also is applied. Thus the reverse driving torque of shaft 348 is delivered to carrier 306. Ring gear 270, since it is connected to sun gear 202, is held stationary and the sun gear 312 then is over-speeded. The motion of sun gear 312 is transmitted through clutch C to the shaft 90. The turbine T2, which is connected to shaft 90, thus develops a high degree of hydrokinetic braking.

What I claim and desire to secure by United States Letters Patent is:

1. A hydrokinetic power transmission mechanism comprising a hydrokinetic unit having two turbines and an impeller, each turbine being disposed in a separate torus circuit, said impeller being in fluid flow relationship with respect to each turbine and defining a common portion of each circuit, a pair of simple planetary gear units, each unit comprising a sun gear, a ring gear, a carrier and planet gears carried by said carrier in meshing engagement with said sun and ring gears, the carrier of a first of said gear units being connected to a driven member, first coupling means for connecting a first turbine to the sun gear of first of said gear units, the ring gear of the other gear unit being connected to the sun gear of said first gear unit, the ring gear of said first gear unit being connected to the sun gear of said other gear unit, second coupling means for connecting the carrier of said other gear unit to the other turbine, brake means for anchoring the sun gear of said other gear unit and the ring gear of said first gear unit to provide a torque reaction, selectively engageable clutch means for connecting said first turbine to said driven member, means for directing toroidal fluid flow from said impeller to each of said turbines selectively to render said turbines alternately operable to accomplish speed ratio changes, and selectively engageable brake means for anchoring the carrier of said other gear unit whereby a reverse drive ratio may be established when said first turbine is rendered operable.

2. A hydrokinetic power transmission mechanism comprising a hydrokinetic unit having two turbines and an impeller, each turbine being disposed in a separate torus circuit, said impeller being in fluid flow relationship with respect to each turbine and defining a common portion of each circuit, a pair of simple planetary gear units, each unit comprising a sun gear, a ring gear, a carrier and planet gears carried by said carrier in meshing engagement with said sun and ring gears, the carrier of a first of said gear units being connected to a driven member, first coupling means for connecting a first turbine to the sun gear of first of said gear units, the ring gear of the other gear unit being connected to the sun gear of said first gear unit, the ring gear of said first gear unit being connected to the sun gear of said other gear unit, second coupling means for connecting the carrier of said other gear unit to the other turbine, brake means for anchoring the sun gear of said other gear unit and the ring gear of said first gear unit to provide a torque reaction, selectively engageable clutch means for connecting said first turbine to said driven member, and means for directing toroidal fluid flow from said impeller to each of said turbines selectively to render said turbines alternately operable to accomplish speed ratio changes, said first turbine being operable during first speed ratio operation, and third speed ratio operation and said second turbine being operable during intermediate speed ratio operation, each of said coupling means comprising overrunning coupling races with overrunning coupling elements disposed therebetween to establish a one-way clutching action, the coupling elements for said first and second coupling means forming in part torque delivery paths to the sun gear of said first gear unit and the carrier of said second gear unit, respectively.

3. A hydrokinetic power transmission mechanism comprising a hydrokinetic unit having two turbines and an impeller, each turbine being disposed in a separate torus circuit, said impeller being in fluid flow relationship with respect to each turbine and defining a common portion of each circuit, a pair of simple planetary gear units, each unit comprising a sun gear, a ring gear, a carrier and planet gears carried by said carrier in meshing engagement with said sun and ring gears, the carrier of a first of said gear units being connected to a driven member, first coupling means for connecting a first turbine to the sun gear of first of said gear units, the ring gear of the other gear unit being connected to the sun gear of said first gear unit, the ring gear of said first gear unit being connected to the sun gear of said other gear unit, second coupling means for connecting the carrier of said other gear unit to the other turbine, brake means for anchoring the sun gear of said other gear unit and the ring gear of said first gear unit to provide a torque reaction, selectively engageable clutch means for connecting said first turbine to said driven member, and means for directing toroidal fluid flow from said impeller to each of said turbines selectively to render said turbines alternately operable to accomplish speed ratio changes, said first turbine being operable during first speed ratio operation and third speed ratio operation and said second turbine being operable during an intermediate speed ratio operation, each of said coupling means comprising overrunning coupling races with overrunning coupling elements disposed therebetween to establish a one-way clutching action, the coupling elements for said first and second coupling means forming in part torque delivery paths to the sun gear of said first gear unit and the carrier of said second gear unit, respectively, and selectively engageable friction clutch means for connecting together the races for said first coupling means to establish hill-braking operation when said first turbine is operable and said brake means is applied.

4. A hydrokinetic power transmission mechanism comprising a multiple turbine hydrokinetic unit and a pair of simple planetary gear units, each gear unit comprising a sun gear, a ring gear, a carrier, planet gears supported upon said carrier in meshing engagement with sun and ring gears, the carrier of a first gear unit being connected to a driven member, brake means for anchoring the ring gear of said first gear unit and sun gear of the other gear unit, means for connecting a first turbine to the sun gear of said first gear unit, the ring gear of the other gear unit being connected to the sun gear of said first gear unit, means for connecting a second turbine to the carrier of said other gear unit, a selectively engageable clutch means for connecting one of said turbines directly to said driven member, and selectively engageable brake means for anchoring the carrier of said second gear unit during reverse drive operation.

5. The combination set forth in claim 4 wherein said hydrokinetic unit comprises, in addition to said first and second turbines, an impeller, each turbine being disposed in a separate torus circuit, said impeller being in fluid flow relationship with respect to each turbine and defining a common portion of each circuit.

6. The combination set forth in claim 4 wherein said hydrokinetic unit comprises, in addition to said first and second turbines, an impeller, each turbine cooperating separately with said impeller to define a separate toroidal fluid flow path, a fluid flow directing baffle means for directing fluid flow from the flow exit region of said impeller to the flow inlet region of each turbine selectively.

References Cited by the Examiner

UNITED STATES PATENTS 2,658,346 11/1953 Seybold _____ 60—54
2,829,542 4/1958 Swennes _____ 74—688

DAVID J. WILLIAMOWSKY, *Primary Examiner.*

J. R. BENEFIEL, *Assistant Examiner.*